United States Patent Office 3,129,104
Patented Apr. 14, 1964

3,129,104
SYNTHETIC WAX SUBSTITUTES FOR CARNAUBA WAX AND TRANSFER INK COMPOSITIONS CONTAINING SUCH SUBSTITUTES
Thomas D. Callinan, Yorktown Heights, Joseph S. Crimi, Poughkeepsie, Hansel L. McGee, Bronx, Ann M. Parks, Tarrytown, and Paul M. Schwartz, Mahopac Falls, N.Y., assignors to International Business Machines Corporation, New York, N.Y., a corporation of New York
No Drawing. Filed Jan. 9, 1961, Ser. No. 81,273
10 Claims. (Cl. 106—31)

The present invention relates to a class of organic esters which are useful as substitutes for carnauba wax and to carbon transfer ink compositions which comprise such compounds.

Carnauba wax is a naturally occurring wax that is derived from the leaves of a palm tree which is indigenous to Brazil. The wax has found many applications in the field of coatings, such as sizes and polishes. In addition, because of its unique properties carnauba wax has been found to be especially satisfactory as a major ingredient in carbon transfer inks of the hot melt type, such as are employed in the manufacture of carbon paper.

Although carnauba wax is generally satisfactory, a great deal of effort has been expended in finding substitutes for the natural wax. An adequate substitute must not only possess properties similar to those of carnauba wax, but must also exhibit the same properties when formulated into transfer inks or other compositions.

The fact that carnauba wax is available through only a single major source of supply has obviously given impetus to the search for substitutes. At present, users of the wax are subject to the economic, agricultural and political uncertainties prevailing in the area from which the wax is obtained. In addition, it has been the experience of manufacturers that the quality of carnauba wax is subject to disturbing fluctuations. Variations introduced into the composition of the carnauba wax by such uncontrollable factors as the weather may in turn render the material unsuited for incorporation into transfer inks or for its other uses. Thus, in order to relieve the manufacturer from dependence on a single source of supply and to provide a material of dependable and predictable composition and properties, it is clearly advantageous to find compounds which may satisfactorily be submitted for carnauba wav, especially in the formulation of carbon transfer inks of the type in question.

In the past, many compounds have been tested, but none has been found to be a full substitute for carnauba wax. Recently, polymer base transfer inks have been suggested, but expense annd problems of formulation and coating have made them unsatisfactory in many applications.

Accordingly, an object of the present invention is to provide a class of compounds which are useful as substitutes for carnauba wax.

Another object of the present invention is the provision of compounds which have properties comparable to those of carnauba wax, both considered alone and when formulated into carbon transfer inks.

An additional object of the present invention is to provide substitutes for carnauba wax which satisfactorily disperse carbon blacks and which also retain hardness when diluted with mineral oil.

A further object of the invention is to provide substitutes for carnauba wax which may be synthesized readily from available chemicals.

Another object of the invention is to provide synthetic materials of dependable properties, composition, purity, etc., which may replace carnauba wax in various formulations, especially carbon transfer inks.

Another object of the invention is to provide carbon transfer ink compositions incorporating novel substitutes for carnauba wax and having properties comparing favorably with inks containing the natural wax.

Other objects of the invention will be pointed out in the following description and claims.

The approach to finding a solution for the problem and for accomplishing the many objects set out above has two principal aspects. First, carnauba wax was subjected to rigorous analysis to achieve a better understanding of the essential molecular properties of the wax, both in bulk form and in the presence of carbon black and oils which make up the other principal ingredients of carbon transfer inks. Secondly, having in hand the information obtained during our analysis, we attempted to synthesize compounds which would duplicate the properties of carnauba wax.

The principal method of analysis employed in the investigation of carnauba wax was dielectric spectroscopy. This is a technique employed to investigate the properties of materials in terms of their molecular and atomic constituents during analysis of their dielectric constants and losses in a temperature range of $-11$ to $+200°$ C. and a frequency range of D.C. to $10^{10}$ c.p.s. By this method it is possible to establish the presence and magnitude of permanent electric moments in the component molecules and to determine whether association exists. The degree of crystallinity may also be established and insight into the molecular structure may be gained.

It is known that approximately 40% of carnauba wax consists of saturated omega hydroxy acid esters having the general formula:

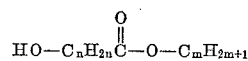

$$\text{HO}-\text{C}_n\text{H}_{2n}\overset{\text{O}}{\underset{\|}{\text{C}}}-\text{O}-\text{C}_m\text{H}_{2m+1}$$

where $n$ is an integer ranging from 18 to 30 and $m$ is an integer of from 24 to 34. These esters are believed to be primarily responsible for the properties of carnauba wax.

As a result of our analysis, it was found that the esters in carnauba wax are aligned in an orderly fashion in the solid state with strong head to head attractions between molecules and strong cohesion of parallel chains through hydrogen bonding. The ester molecules are essentially bi-dipolar and are capable of molecular rotation in the solid state when the temperature is raised slightly above room temperature. The importance of carnauba wax lies in the presence simultaneously of a high degree of order among the molecules and a certain freedom of the dipoles. In the presence of an equal weight of a paraffin oil, such as the oils usually employed in the formulation of carbon transfer inks, carnauba wax retains its original identity. When fully compounded into an ink formula, carnauba wax still retains some of its original identity, but a secondary structure is also formed which is characterized by dielectric dispersions at lower temperatures than observed in the wax alone. This secondary structure most probably determines the flow properties of the ink.

From this analysis, it was indicated that a substitute for carnauba wax might be found by synthesizing a pure organic compound containing two dipolar groups.

After considerable experimentation, we have synthesized a class of compounds which are well suited to use as substitutes for carnauba wax and which also compare favorably with carnauba wax when incorporated into carbon transfer inks of the hot melt type.

The compounds of the present invention are the mono and di-esters formed by the reaction of saturated or unsaturated dicarboxylic acids or acid anhydrides having from 4 to 10 carbon atoms and long chain fatty alcohols having from 16 to 22 carbon atoms in the chain.

The compounds of the invention have the following general formula:

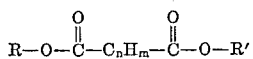

In the above formula, $n$ is an integer of from 2 to 8, $m$ is an integer equal to $2n$ or $2n-2$, R is an alkyl group having from 16 to 22 carbon atoms in the chain and R' is either hydrogen or an alkyl group containing from 16 to 22 carbon atoms in the chain.

The following specific examples of the preparation of synthetic carnuaba wax substitutes will be helpful to a clear understanding of the invention:

EXAMPLE I

To a one liter round bottom distilling flask 73.5 grams of maleic anhydride, 162.3 grams of docosyl alcohol and 400 ml. of toluene are added. The mixture is refluxed for five hours. The temperature of the liquid is 111° C.

Upon cooling, the ester and some of the unreacted starting materials crystallize out of the toluene. The mixture is then filtered through a Buchner funnel and the filtrate is discarded. The residue is redissolved in 1000 ml. of hot toluene, and allowed to cool overnight; the ester crystallizes out. The mixture is again filtered through a Buchner funnel and the filtrate is discarded. The melting point of the solid residue is 69–72° C. The recrystallization procedure is repeated until a constant melting point of 80–82° C. is obtained. Infrared analysis demonstrated that the material is monodocosyl maleate. A neutralization equivalent of 411.86 further confirms the infrared data.

EXAMPLE II

To a one liter round bottom distilling flask are added 100.07 grams of succinic anhydride, 326 grams of docosyl alcohol and 400 ml. of toluene. The mixture is refluxed for five hours. The temperature of the liquid is 110° C.

Upon cooling, the ester and some of the unreacted starting materials crystallize out of the toluene. The mixture is then filtered through a Buchner funnel and the filtrate is discarded. The residue is redissolved in 1000 ml. of hot tetrahydrofuran and ethyl alcohol and allowed to cool overnight; the ester crystallizes out. The mixture is again filtered through a Buchner funnel, and the filtrate is discarded.

The melting point of the solid residue is 76–78° C. The purification procedure is repeated until a constant melting point of 80.3–81.0° C. and a refractive index of 1.4361 at 90° C. is obtained. Infrared analysis demonstrated that the material is monodocosyl succinate. A chemical analysis of the compound is made to further confirm the infrared data. The theoretical values are 73.17% carbon, 11.83% hydrogen, 15.00% oxygen and the found values are 73.29% carbon, 11.98% hydrogen, 14.79% oxygen.

EXAMPLE III

To a one liter round bottom distilling flask are added 82.6 grams of succinic acid, 489 grams of docosyl alcohol and 400 ml. of toluene. As a catalyst for this reaction 1.65 grams of p-toluenesulfonic acid is also added. The mixture is refluxed with the azeotropic distillation of water. The temperature of the liquid is 111° C. When an equivalent volume of water is collected in the water trap, refluxing is stopped.

Upon cooling, the ester and unreacted starting materials crystallize out of the toluene. The mixture is then filtered through a Buchner funnel and the filtrate is discarded. The residue is redissolved in 1000 ml. of hot tetrahydrofuran, and allowed to cool overnight; the ester crystallizes out. The mixture is again filtered through a Buchner funnel and the filtrate is discarded. The melting point of the solid residue is 77–79° C. The procedure is repeated five times until a constant melting point of 79.5–80.1° C. and a refractive index of 1.4382 at 90° C. is obtained. Infrared analysis indicates that the material produced is didocosyl succinate. A chemical analysis of the compound confirms the infrared data. The theoretical values for the compound are 78.39% carbon, 12.91% hydrogen, 8.70% oxygen and the found values are 78.42% carbon, 13.13% hydrogen, 8.87% oxygen.

EXAMPLE IV

To a one liter round bottom distilling flask are added 24 grams of pimelic acid, 97 grams of docosyl alcohol and 400 ml. of toluene. As a catalyst for this reaction, 0.24 gram of p-toluenesulfonic acid are also added. The mixture is then refluxed with the azeotropic distillation of water. The temperature of the liquid is 111° C. When an equivalent volume of water is collected in the water trap, refluxing is stopped.

Upon cooling, the ester and unreacted starting materials crystallize out of the toluene. The mixture is then filtered through a Buchner funnel and the filtrate is discharded. The residue is redissolved in 1000 ml. of hot tetrahydrofuran and methyl alcohol, and allowed to cool overnight; the ester crystallizes out. The mixture is again filtered through a Buchner funnel and the filtrate is discarded. The melting point of the solid residue is 70–72° C. The purification procedure is repeated until a constant melting point of 72.0–72.8° C. and a refractive index of 1.4384 at 90° C. is obtained. Infrared analysis demonstrates that the material is didocosyl pimelate. A chemical analysis of the compound confirms the infrared data. The theoretical values for the compound are 74.92% carbon, 12.20% hydrogen, 12.88% oxygen and the found values are 75.15% carbon, 12.18% hydrogen, 13.09% oxygen.

EXAMPLE V

To a one liter round bottom distilling flask are added 101.1 grams of sebacic acid, 326.61 grams of docosyl alcohol and 500 ml. of toluene. As a catalyst for this reaction 1.5 grams of p-toluenesulfonic acid are also added. The mixture is then refluxed with the azeotropic distillation of water. The temperature of the liquid is 111° C. When an equivalent volume of water is collected in the water trap, refluxing is stopped.

Upon cooling, the ester and unreacted starting materials crystallize out of the toluene. The mixture is then filtered through a Buchner funnel and the filtrate is discarded. The residue is redissolved in 1000 ml. of hot tetrahydrofuran, and allowed to cool overnight; the ester crystallizes out. The mixture is again filtered through a Buchner funnel and the filtrate is discarded. The melting point of the solid residue is 71–72° C. The purification procedure is repeated until a constant melting point of 73.4–74.0° C. and a refractive index of 1.4392 at 90° C. are obtained. Infrared analysis indicates that the material was didocosyl sebacate. A chemical analysis of the compound is made and confirms the infrared data. The theoretical values for the compound are 79.13% carbon, 13.06% hydrogen, 7.81% oxygen and the found values are 79.26% carbon, 13.29% hydrogen, 7.82% oxygen.

The preceding illustrative examples relate to the preparation of the carnauba substitutes using docosanol as the alcohol reactant. By the same basic reactions, we have produced other substitutes, using straight chain aliphatic alcohols having from 16 to 22 carbon atoms in the chain.

Suitable carnauba substitutes which are within the scope of the present invention and which may be prepared by procedures similar to those outlined in the examples are included in the following list, designated Table I.

Table I

Mono-hexadecyl succinate
Di-hexadecyl succinate
Di-octadecyl succinate
Mono-octadecyl succinate
Mono-docosyl succinate
Di-docosyl succinate Mono-hexadecyl glutarate
Di-hexadecyl glutarate
Mono-octadecyl glutarate
Di-octadecyl glutarate
Mono-docosyl glutarate
Di-docosyl glutarate Di-hexadecyl adipate
Di-octadecyl adipate
Di-docosyl adipate Di-hexadecyl pimelate
Di-octadecyl pimelate
Di-docosyl pimelate Di-hexadecyl azelate
Di-octadecyl azelate
Di-docosyl azelate Di-hexadecyl sebacate
Di-octadecyl sebacate
Di-docosyl sebacate Mono-hexadecyl maleate
Di-hexadecyl maleate
Mono-octadecyl maleate
Di-octadecyl maleate
Mono-docosyl maleate
Di-docosyl maleate Di-hexadecyl fumarate
Di-octadecyl fumarate
Di-docosyl fumarate It will be noted that the acid reactants employed in the formation of the synthetic wax compounds comprise acids and acid anhydrides having from 4 to 10 carbon atoms in the chain. The acid may be saturated or unsaturated.

We have prepared mono alkyl succinates, glutarates, and maleates from the respective anhydrides. It is expected, however, that the mono esters of the other acids also would have properties which would make them satisfactory as substitutes for carnauba wax in keeping with the present invention.

The alkyl radicals employed to esterify the acid or acid anhydrides are derived from straight chain aliphatic alcohols having from 16 to 22 carbon atoms in the chain. The chain may have an odd or even number of carbon atoms. Enough experiments have been conducted to indicate that all of the alcohols within the general type specified will yield compounds which are satisfactory substitutes for carnauba wax. Mono- and di-esters of di-carboxylic acids and anhydrides with long chain alcohols having up to 15 carbon atoms have been disclosed in the prior art, but these compounds are not satisfactory for present purposes. For the most part such prior art compounds have melting points which are too low and do not form satisfactory coatings when incorporated into ink compositions and the like. This is attributable to the fact that esters formed with alcohols having 15 carbon atoms or less in the chain do not produce satisfactory gels when formulated with oils and the other ingredients which make up carbon transfer inks.

Carbon paper ink generally is a mixture of wax, oil and a coloring substance, usually carbon blacks. Conventional inks usually contain carnauba wax or carnauba wax blended with other waxes. The natural waxes, especially carnauba wax are able to be dispersed with paraffin or mineral oil and carbon black without heating to extremely high temperatures. This might adversely affect the properties of the oil or of other additives to the composition. Also, after moderate heating and thorough dispersion the composition attains a fluidity which enables it to be roller-coated on a paper base to produce an even, smooth uniform coating. Upon hardening, the inks show good retention of the oil and are relatively free from smudging.

The new transfer ink compositions produced according to the present invention duplicate very closely the properties and performance of conventional ink compositions containing carnauba wax. We generally theorize that this is the result of the duplication in the synthetic compounds of the bi-dipolarity, found in the esters which make up the major ingredient of natural waxes such as carnauba wax. It is further theorized that the synthetic compounds of the present invention form a matrix or sponge-like medium into which paraffin oils and the coloring materials are absorbed, analogous to the absorption of water into a sponge. Our dielectric studies of carnauba wax in association with paraffin oils indicates that carnauba wax also furnishes a matrix for paraffin oils and that this accounts in large measure for the utility of carnauba wax in the formulation of carbon paper inks.

Accordingly, the novel transfer ink compositions of the present invention comprise paraffin ink oils, carbon blacks and compounds of the class described having the following general formula:

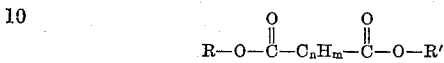

In the above formula, $n$ is an integer of from 2 to 8, $m$ is an integer equal to either $2n$ or $2n-2$, R is an alkyl group containing from 16 to 22 carbon atoms in the chain and R' is either hydrogen or an alkyl group containing from 16 to 22 carbon atoms.

The following are examples of the preparation of typical carbon paper inks according to the present invention.

EXAMPLE VI

A basic ink formulation was prepared by adding 25.8 grams of didocosyl succinate to a five and one half ounce capacity stainless steel mill. 25.8 grams of paraffin ink oil were then added to the mill and the mill was placed on a hot plate to melt the wax. The didocosyl succinate beings to melt at about 77–78° C. After the didocosyl succinate has been completely melted, 8.4 grams of carbon black and 3 grams of nigrosine oleate toner were added and the heating is continued. When the temperature reaches 100° C., hot steel balls are added and the mill is shaken vigorously for about 10 minutes. During this time, the temperature in the mill drops to about 75° C. The ink is then transferred to a standard carbon paper coating machine and is coated on a standard carbon paper backing. After tests for printability and wear, it was found that the novel carbon paper ink composition, comprising didocosyl succinate as a substitute for carnauba wax, compared favorably with inks containing the natural wax.

EXAMPLE VII

An ink composition is prepared according to the steps outlined in Example VI, except that 25.8 grams of didocosyl sebacate are substituted in the formulation for the didocosyl succinate.

EXAMPLE VIII

An ink is prepared as in Example VI except 25.8 grams of dioctadecyl succinate are substituted for the didocosyl succinate.

EXAMPLE IX

An ink is prepared according to the method in Example VI except that 25.8 grams of mono docosyl succinate are substituted for the didocosyl succinate.

EXAMPLE X

An ink composition is prepared as in Example VI, except 25.8 grams of dioctadecyl sebacate are substituted for the didocosyl succinate.

Mixtures of the carnauba substitutes of the present invention may also be used in the formulation of transfer inks in the same manner as indicated in the preceding examples.

Printability of the foregoing ink compositions as determined by the quality of a fifth carbon copy prepared with the formulated inks was uniformly good in all cases tested.

The paraffin ink oils used in the above examples are available from commercial sources. The exact composition of the oils is not known, but they are generally identified as polycyclic, high-boiling petroleum fractions that have been de-colorized by activated fuller's earth or bauxite.

The carbon blacks employed in the manufacture of carbon paper inks are what are generally defined as channel blacks. Channel blacks of the long flow variety are generally preferred for use in carbon papers and are available commercially under the following trade names, Kohinoor, Witcolith, and Peerless.

Toners and other dispersing agents are frequently added to carbon paper ink compositions to obtain desired properties. Toners are prepared by precipitation of organic dyes onto the surface of carbon blacks.

The proportions of synthetic wax, oil and carbon black may be varied within fairly wide ranges according to the properties desired in the final ink coating. Generally, the basic ingredients in carbon transfer ink compositions of the present type may vary within the following ranges: synthetic wax from 30% to 50% by weight of the composition, paraffin ink oil from 10% to 50%, and carbon blacks from about 2% to 20%. Up to about 30% of toners and other optional additives may also be included.

While it might be generally speculated that esters of high molecular weight, alcohols and acids might furnish synthetic waxes similar to carnauba wax, it was only through out intensive research and analysis of carnauba wax that we were able to duplicate so closely its properties both alone and in ink compositions. We have produced a synthetic class of compounds which have bidipolarity, dipolar groups spaced by relatively long carbon chains, generally similar molecular structure and the capacity for forming a matrix for the reception and retention of paraffin oils and carbon black in the formulation of transfer inks. The compounds also have satisfactory melting points which enable them to be formulated into inks and coated by standard coating machines without important departure from conventional practice.

While there have been shown and described and pointed out the fundamental features of the invention as applied to a number of specific embodiments, it will be understood that various omissions, substitutions and changes may be made by persons skilled in the art without departing from the scope of the invention.

It is the intention, therefore, to be limited only as indicated by the scope of the following claims.

What is claimed is:

1. Carbon transfer inks of the hot-melt type comprising as the wax ingredient from 30% to 50% by weight of at least one compound selected from the class of compounds having the general formula:

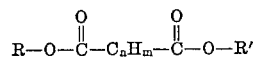

where $n$ is an integer of from 2 to 8, $m$ is an integer selected from the group consisting of $2n$ and $2n-2$, R is an alkyl group having from 16 to 22 carbon atoms and R' is a substituent selected from the group consisting of hydrogen and an alkyl radical having from 16 to 22 carbon atoms, the balance comprising paraffin ink oil and carbon blacks.

2. Carbon transfer inks of the hot-melt type comprising from about 30% to 50% by weight of at least one compound selected from the class of compounds having the general formula:

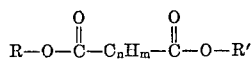

where $n$ is an integer of from 2 to 8, $m$ is an integer selected from the group consisting of $2n$ and $2n-2$, R is an alkyl group having from 16 to 22 carbon atoms and R' is a substituent selected from the group consisting of hydrogen and an alkyl radical having from 16 to 22 carbon atoms, from about 10% to 50% by weight of paraffin ink oil and from about 2% to 20% by weight of carbon blacks and up to 30% of toners.

3. The carbon transfer ink of claim 2 wherein said compound is didocosyl succinate.

4. The carbon transfer ink of claim 2 wherein said compound is didocosyl sebacate.

5. The carbon transfer ink of claim 2 wherein said compound is mono-docosyl glutarate.

6. The carbon transfer ink of claim 2 wherein said compound is didocosyl azelate.

7. Carbon transfer inks of the hot-melt type comprising from about 30% to 50% by weight of a mixture of compounds selected from the class of compounds having the general formula:

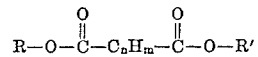

where $n$ is an integer of from 2 to 8, m is an integer selected from the group consisting of $2n$ and $2n-2$, R is an an alkyl group having from 16 to 22 carbon atoms and R' is a substituent selected from the group consisting of hydrogen and an alkyl radical having from 16 to 22 carbon atoms, from about 10% to 50% by weight of paraffin ink oil and from 2% to 20% by weight of carbon blacks.

8. The carbon transfer ink of claim 7 wherein one of the compounds of said mixture is didocosyl succinate.

9. The carbon transfer ink of claim 7 wherein one of the compounds of said mixture is didocosyl sebacate.

10. The carbon transfer ink of claim 7 comprising from about 30% to 50% by weight of a mixture of mono-docosyl glutarate and didocosyl azelate.

References Cited in the file of this patent

UNITED STATES PATENTS

| | | |
|---|---|---|
| 2,519,321 | Newman | Aug. 15, 1950 |
| 2,589,306 | Steiner | Mar. 18, 1952 |
| 2,811,551 | Coffman et al. | Oct. 29, 1957 |
| 2,824,889 | Bruson et al. | Feb. 25, 1958 |
| 3,023,183 | Nelson | Feb. 27, 1962 |

OTHER REFERENCES

Hain et al.: "Synthetic Low Temperature Greases From Aliphatic Diesters," I.E.C., volume 39, No. 4, April 1947, page 501.

Huber et al.: "Preparation and Properties of Some Hexadecyl Hydrogen Esters of Dibasic Acids," J. Amer. Chem. Soc., volume 79, July 20, 1957, pages 3919–3920.